US012709649B2

(12) United States Patent
Möller et al.

(10) Patent No.: US 12,709,649 B2
(45) Date of Patent: Aug. 18, 2026

(54) PROCESS FOR OBTAINING GLYCAN EXTRACTS FROM APPLE POMACE, PROCESS FOR PRODUCING FUNCTIONALIZED GLYCANS, AND FUNCTIONALIZED GLYCAN THAT CAN BE PRODUCED BY THE PROCESS AND ITS USE

(71) Applicant: FRAUNHOFER-GESELLSCHAFT ZUR FÖRDERUNG DER ANGEWANDTEN FORSCHUNG E.V., Munich (DE)

(72) Inventors: Annike Möller, Alzenau (DE); Stefan Hanstein, Alzenau (DE)

(73) Assignee: Fraunhofer-Gesellschaft zur förderung der angewandten Forschung e.V., Munich (DE)

( * ) Notice: Subject to any disclaimer, the term of this patent is extended or adjusted under 35 U.S.C. 154(b) by 638 days.

(21) Appl. No.: 18/005,287

(22) PCT Filed: Jul. 12, 2021

(86) PCT No.: PCT/EP2021/069357
§ 371 (c)(1),
(2) Date: Jan. 12, 2023

(87) PCT Pub. No.: WO2022/013161
PCT Pub. Date: Jan. 20, 2022

(65) Prior Publication Data

US 2023/0257486 A1 Aug. 17, 2023

(30) Foreign Application Priority Data

Jul. 16, 2020 (DE) ..................... 10 2020 208 914.0

(51) Int. Cl.
*C08B 37/14* (2006.01)
*C08B 37/00* (2006.01)

(52) U.S. Cl.
CPC .......... *C08B 37/14* (2013.01); *C08B 37/0003* (2013.01)

(58) Field of Classification Search
CPC ............................ C08B 37/14; C08B 37/0003
USPC ............................................................ 536/56
See application file for complete search history.

(56) References Cited

U.S. PATENT DOCUMENTS

2012/0058536 A1* 3/2012 Ruda ..................... C11D 3/227 525/54.23

FOREIGN PATENT DOCUMENTS

| | | | |
|---|---|---|---|
| CN | 1337410 | A | 2/2002 |
| CN | 1876685 | A | 12/2006 |
| CN | 109134675 | A | 1/2019 |
| DE | 199 43 188 | A1 | 3/2001 |

OTHER PUBLICATIONS

Cunha et al. Turning polysaccharides into hydrophobic materials::a critical review. Part 2. Hemicelluloses, chitin/chitosan, starch, pectin and alginates. Cellulose (2010) 17:1045-1065. (Year: 2010).*
Garna et al. Effect of Extraction Conditions on the Yield and Purity of Apple Pomace Pectin Precipitated but NotWashed by Alcohol. J. Food Sci. 72(1):C1-C9, 2007. (Year: 2007).*
Doner et al., "Isolation of Hemicellulose from Corn Fiber by Alkaline Hydrogen Peroxide Extraction," *Cereal Chemistry* 74(2): 176-181 (1997).
Froschauer et al., "Separation of Hemicellulose and Cellulose from Wood Pulp by Means of lonic Liquid/Cosolvent Systems," *Biomacromolecules* 14(6): 1741-1750 (2013).
Hasegawa et al., "New Pretreatment Methods Combining a Hot Water Treatment and Water/Acetone Extraction for Thermo-Chemical Conversion of Biomass," *Energy Fuels* 18(3): 755-760 (2004).
Katsura et al., "NMR analyses of polysaccharide derivatives containing amine groups," *Carbohydrate Polymers* 18(4): 283-288 (1992).
Palm et al., "Extraction of Hemicellulosic Oligosaccharides from Spruce Using Microwave Oven or Steam Treatment," *Biomacromolecules* 4(3): 617-623 (2003).
"From fruit to pectin," Product Brochure from Herbstreith & Fox KG Pektin-Fabriken dated Aug. 25, 2015: https://docplayer.org/47326221-Von-der-Fruch npektin.html [retrieved on Jan. 26, 2021].
"Polysaccharides," RÖMPP Lexicon, Georg Thieme Verlag KG, Stuttgart, https://roempp.thieme.de/lexicon/RD-16-03659 (print date: Jan. 25, 2021).
Heinze et al., "Carboxymethyl Ethers of Cellulose and Starch—A Review," *Macromol. Symp.* 223(1): 13-39 (2005).
Reising et al., "Hemicelluloses from Fruit Residues for Coatings on Packaging," *Chem. Unserer Zeit* 52(5): S. 287 (2018).
Tunc et al., "Characterization and molecular weight distribution of carbohydrates isolated from the autohydrolysis extract of mixed southern hardwoods," Carbohydrate Polymers 83(1): 8-13 (2011).
German Patent Office, Office Action in German Patent Application No. 10 2020 208 914.0 (Jan. 29, 2021).
European Patent Office, International Search Report in International Application No. PCT/EP2021/069357 (Nov. 8, 2021).
European Patent Office, Written Opinion in International Application No. PCT/EP2021/069357 (Nov. 8, 2021).

(Continued)

*Primary Examiner* — Yih-Horng Shiao
(74) *Attorney, Agent, or Firm* — Leydig, Voit & Mayer, Ltd.

(57) ABSTRACT

Disclosed is a process for obtaining glycan extracts from apple pomace in which a mixture comprising apple pomace and water is extracted into water so that an aqueous glycan extract is obtained; at least one alcohol is added to the extract, whereby a solid glycan extract is precipitated; and the solid glycan extract is separated from the liquid. Also disclosed is a process for producing functionalized glycan wherein the glycan is converted using at least one amine into at least one functionalized glycan. Also disclosed are a functionalized glycan that is produced by the method and uses thereof.

7 Claims, 5 Drawing Sheets

(56) References Cited

OTHER PUBLICATIONS

International Bureau of WIPO, International Preliminary Report on Patentability in International Application No. PCT/EP2021/069357 (Jan. 17, 2023).

* cited by examiner

Fig. 4

OH HO O HO OH O OH OH Cl N HCl NaOH N O HO O HO OH O OH O N+ N

PROCESS FOR OBTAINING GLYCAN EXTRACTS FROM APPLE POMACE, PROCESS FOR PRODUCING FUNCTIONALIZED GLYCANS, AND FUNCTIONALIZED GLYCAN THAT CAN BE PRODUCED BY THE PROCESS AND ITS USE

CROSS-REFERENCE TO RELATED APPLICATIONS

This patent application is the U.S. national phase of International Application No. PCT/EP2021/069357, filed on Jul. 12, 2021, which claims the benefit of German Patent Application No. 10 2020 208 914.0, filed Jul. 16, 2020, the disclosures of which are incorporated herein by reference in their entireties for all purposes.

The present invention relates to a process for obtaining glycan extracts from apple pomace in which a mixture comprising apple pomace and water is provided; the mixture is subjected to an extraction treatment in which at least one glycan is extracted from the apple pomace into the water so that an aqueous glycan extract is obtained that comprises the at least one glycan; at least one alcohol is added to the aqueous glycan extract, whereby a solid glycan extract is precipitated that comprises the at least one glycan; and the solid glycan extract is separated from the liquid. The present invention additionally relates to a process for producing functionalized glycans in which a solid glycan extract is first obtained from apple pomace that comprises at least one glycan using the process for obtaining glycan extracts and then the at least one glycan is converted using at least one amine into at least one functionalized glycan. The present invention furthermore also relates to a functionalized glycan that can be or is produced by the method in accordance with the invention and to a use of same.

200,000 t of apple pomace is accumulated in juice production every year in Germany alone. The following recycling methods already take place for this waste material in the sense of a complete utilization: on the one hand, the use of the dried pomace as feedstuff and, on the other hand, for the production of pectin. Only 10 to 15% of the apple pomace is used in pectin production. A further 20 to 30% of the apple pomace is sold as sweetener. 55 to 70% thus remain as depectinized pomace. A further utilization possibility comprises the use of the branched glycans (hemicelluloses) comprised therein as functional polymers in coatings of the packaging and paper industries.

The branched polymer character of the hemicelluloses and the high number of reactive hydroxyl groups offer various performance advantages over commercially available bio-based raw materials for coatings.

1) Glycerin, vegetable fatty acids, polyvalent alcohols, and carboxylic acids first have to be polymerized to form a branched binder as a binder in alkyd resins. Branched glycan derivatives as binders or at least as binder components offer a large number of crosslinkable groups.
2) Unbranched glycans (chitosan, nanocellulose) are already used in other coating systems (e.g. bioORMOCERS®). In comparison with linear molecules, the branched character of hemicelluloses makes possible the performance advantage of a high solid fraction in aqueous and aqueous-alcoholic lacquer systems and printing inks. For the branched molecule has a higher solubility at the same molecular weight of an unbranched polymer and of a branched polymer.
3) Branched glycans are used in a large quantity as paper gauge. Hemicelluloses represent an alternative here that does not compete with food production.

A basic requirement for the industrial use of functional polymers in coating liquids is that they can be dissolved or finely dispersed in the liquid. The technical problem comprises the limited solubility of the native hemicelluloses from the apple pomace in the aqueous, and in particular in the aqueous-alcoholic environment. Hemicelluloses from apple pomace can only be dissolved in water in concentrations below 1%. The molecules aggregate at higher concentrations. There is thus the necessity of a chemical modification of the hemicelluloses that counteracts the aggregation in aqueous and aqueous-alcoholic solutions. A further condition for the use of the glycans in the widespread coating systems that harden in an epoxide based manner comprises the solubility being improved at pH values between 3 and 7. In addition, the production process of the modified glycans for a use as a functional polymer should be inexpensive and resource saving. The production process should therefore preferably be limited to as few steps as possible. No such process for the production of the corresponding glycan derivatives from apple pomace has previously been successful.

The technical problem of the limited solubility of glycans in aqueous or aqueous-alcoholic solutions has previously been solved by chemical functionalizations of the glycans. The aggregation of macromolecules in water and aqueous-alcoholic solutions can be reduced by the integration of charged groups that give the molecule a positive or negative total charge or at least a surface charge. Corresponding glycan ethers and glycan esters of starch and cellulose are commercially available. Carboxymethyl derivatives are particularly known among ethers. Carboxymethyl derivatives do not have any charge at a pH of the medium in the range of the pK value of the carboxyl group (approximately 4) and lower so that the solubility of carboxymethyl derivatives is not suitable for epoxy resin systems.

In accordance with the previous prior art, the extraction of hemicellulose can take place e.g. by an alkaline extraction, alkaline peroxide extraction (see e.g. L. W. Doner, K. B. Hicks, Cereal Chemistry, 1997, 74, 176-181), hot water extraction (see e.g., Hasegawa, K. Tabata, O. Okuma, K. Mae, Energy Fuels, 2004, 18, 755-760), steam treatment (see e.g. M. Palm, G. Zacchi, Biomacromolecules, 2003, 4, 617-623), and ionic liquid extraction (see e.g. C. Froschauer, M. Hummel, M. Iakovlev, A. Roselli, H. Schottenberger, H. Sixta, Biomacromolecules, 2013, 14, 1741-1750). The hemicellulose obtaining frequently includes a pre-treatment with diluted acid that often comprises 0.5 to 1% sulfuric acid. Specifically the hemicelluloses from apple pomace have previously predominantly been obtained by extraction processes by means of lye. The reaction conditions for temperature and time can vary and are at 70 to 100° C. and 30 min. to 4 h. This hemicellulose obtaining frequently includes an acidic pre-treatment to remove pectins.

Starting from this, it was thus the object of the present invention to provide an inexpensive and resource saving process for obtaining glycan extracts. It was additionally the object of the present invention to provide an inexpensive and resource saving process with which functionalized glycans that have high water solubility can be produced.

These objects are achieved by the features of the process for obtaining glycan extracts and by the features of the process for producing functionalized glycans described herein, and the functionalized glycan that can be or is manufactured by the process and its use, also described herein, as well as the advantageous developments thereof.

BRIEF DESCRIPTION OF THE DRAWINGS

FIG. 4 depicts an amination reaction of apple glycan with 2-chloro-N,N-diethylethylamine in an aspect of the invention.

DETAILED DESCRIPTION OF THE INVENTION

Figure 1:
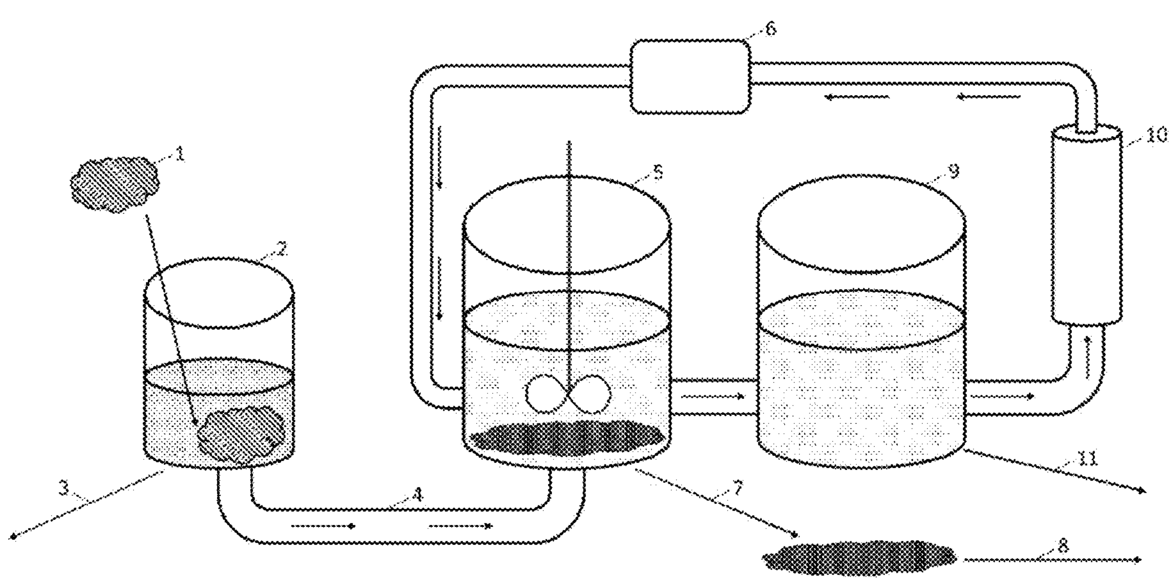
FIG. 1 depicts a process scheme to obtain glycan or glycans from apple pomace in an aspect of the invention.

A process for obtaining glycan extracts is thus provided in accordance with the invention in which a) a mixture comprising apple pomace and water is provided;

b) the mixture is subjected to an extraction treatment in which at least one glycan is extracted from the apple pomace into the water so that an aqueous glycan extract is obtained that comprises the at least one glycan;

c) at least one alcohol is added to the aqueous glycan extract, whereby a solid glycan extract is precipitated that comprises the at least one glycan; and d) the solid glycan extract is separated from the liquid.

Glycans are also called polysaccharides. They are carbohydrates in which a large number of monosaccharides (preferably at least eleven) are linked via a glycosidic bond. The at least one glycan is preferably a mixture of glycans or polysaccharides, in particular a mixture of branched glycans or branched polysaccharides. The at least one glycan is more preferably hemicellulose. Hemicellulose is a collective term for mixtures of polysaccharides in a varying composition that occur in vegetable biomass.

In step a) of the process in accordance with the invention, a mixture is first provided that comprises both apple pomace and water. The mixture can be provided, for example, in that the apple pomace is mixed with water (and optional further components). Apple pomace is pressing residue that occurs in the pressing of apples, e.g. in the production of apple juice. Apple pomace has a high sugar content and comprises glycans. The mixture provided in step a) can consist of apple pomace and water. Alternatively, the mixture provided in step a) can also include one or more further components in addition to apple pomace and water. This further component/These further components can be at least partially dissolved in water. The mixture can thus also comprise an aqueous solution.

In step b), the mixture provided in step a) is subjected to an extraction treatment. At least one glycan comprised in the apple pomace is extracted from the apple pomace into the water or the aqueous solution in this treatment. An aqueous glycan extract is obtained in this manner that comprises the at least one glycan. The extraction treatment can take place at an elevated temperature, e.g. in the range from 80° C. to 300° C. Subsequent to step b), the aqueous glycan extract can preferably be separated from the solid fraction of the mixture, i.e. from the solid residues of the apple pomace.

In step c), at least one alcohol is then added to the aqueous glycan extract obtained in step b). A solid glycan extract that comprises the at least one glycan is precipitated by the addition of the alcohol. In step c), a mixture is thus obtained that includes a solid fraction having the solid glycan extract and a liquid fraction. Ethanol, methanol, or isopropanol can be used as the alcohol, for example.

In step d), the solid glycan extract obtained in step c) is separated from the liquid or from the liquid fraction of the mixture of step c). This can be done, for example, by filtration or centrifugation. Subsequent to step d), the solid glycan extract, the solid glycan extract can preferably be dried.

The process in accordance with the invention can therefore advantageously comprise only very few steps. In addition, the apple pomace used as the starting material is an inexpensive and easily accessible natural product. A simple possibility for the obtaining of glycans from apple pomace is furthermore provided by the use of an extraction process in combination with the precipitation by addition of an alcohol. As a consequence, the process in accordance with the invention is inexpensive and resource saving.

The residue of the apple pomace remaining after the extraction can furthermore be used as feedstuff by the use of an aqueous extraction agent. This also makes the process resource saving and sustainable.

Viewed overall the process in accordance with the invention thus represents an inexpensive and resource saving process for obtaining glycan extracts.

A preferred variant of the process in accordance with the invention is characterized in that the mixture provided in step a) has a mass ratio of apple pomace to water of 1:2 to 1:50, preferably of 1:5 to 1:30, more preferably of 1:10 to 1:25. A particularly high portion of the glycan comprised in the apple pomace can be extracted from the apple pomace into the water or into the aqueous solution by using such a mass ratio.

In a further preferred variant of the process in accordance with the invention, the apple pomace comprised in the mixture provided in step a) is depectinized. Depectinized apple pomace is preferably used for the process. Alternatively, the apple pomace can also be depectinized as part of the process prior to step a). The depectinization can e.g. take place by treating the apple pomace with an acid, e.g. sulfuric acid. The produced functionalized glycan comprises fewer substances that impair its quality due to the use of depectinized apple pomace. In particular the protein content is lower.

A further preferred variant of the process in accordance with the invention is characterized in that the extraction treatment in step b) takes place at a temperature in a range from 80° C. to 300° C., preferably in a range from 100° C. to 250° C., more preferably in a range from 140° C. to 200° C.; and/or over a time period of 20 minutes to 8 hours, preferably of 60 minutes to 4 hours, more preferably of 90 minutes to 150 minutes.

A particularly high portion of the glycan comprised in the apple pomace can be extracted from the apple pomace into the water or into the aqueous solution by an extraction treatment with such a temperature and/or duration.

The extraction process in step b) can preferably comprise a percolation process. The latter is in particular suitable for a carrying out at an industrial scale. A circulation time (of the water) can preferably be used here that is in a range from 0.1 min. to 5.0 min., more preferably in a range from 0.5 min. to 3.0 min., even more preferably in a range from 1.0 min. to 1.5 min. In this process, the flow rate (of the water) can amount to 50 l/min. and the extraction volume (incl. lines and heat exchangers) can amount to 60 liters.

At a laboratory scale, the extraction process can be carried out, for example, at a pressure digestion temperature without a stirrer.

In accordance with a further preferred variant of the process in accordance with the invention, the aqueous glycan extract is separated from the solid between steps b) and c). In other words, the aqueous glycan extract is separated from the solid fraction of the mixture, i.e. from the solid residues of the apple pomace, in this process. The further process can be simplified in this manner since a very simple separation of the solid glycan extract from the liquid is thus made possible in step d), for example, without there being the risk in this process that residues of the apple pomace still present are also separated.

The aqueous glycan extract is preferably separated from the solid between steps b) and c) by a method that is selected from the group consisting of filtration, centrifugation, and combinations thereof. A simple and clear separation can be achieved in this manner.

A further preferred variant of the process in accordance with the invention is characterized in that the at least one alcohol is selected from the group consisting of ethanol, methanol, isopropanol, and mixtures thereof; and/or is added to the aqueous glycan extract for so long until it is present in the mixture produced (on the addition of the at least one alcohol to the aqueous glycan extract) in a concentration that is in the range from 50% vv to 99% vv, more preferably in the range from 60% vv to 90% vv, even more preferably in the range from 65% vv to 85% vv.

A particularly simple and clear precipitation of the solid glycan extract can be achieved with ethanol, methanol, isopropanol, or mixtures thereof. The at least one alcohol is more preferably ethanol since the precipitated solid glycan extract here only has a few contaminants.

Contaminants in the solid glycan extract can also be counteracted by the suitable choice of the concentration of the alcohol. A concentration of the at least one alcohol in the mixture produced (on the addition of the alcohol to the aqueous glycan extract) in the range from 50% vv to 99% vv, more preferably in the range from 60% v to 90% vv, even more preferably in the range from 65% vv to 85% vv, thus results in fewer contaminants in the solid glycan extract.

In a further preferred variant of the process in accordance with the invention, the separation of the solid glycan extract from the liquid in step d) takes place by a method that is selected from the group consisting of centrifugation, filtration, and combinations thereof. In this manner, the solid glycan extract can be simply separated from the liquid.

A further preferred variant of the process in accordance with the invention is characterized in that the solid glycan extract is dried after step d). In this manner, a simpler conversion of the at least one glycan comprised in the solid glycan extract with at least one amine into at least one functionalized glycan is made possible. The drying preferably takes place under vacuum at temperatures below 25° C., more preferably under vacuum at temperatures below 5° C. A drying can thus be achieved that is as complete as possible and simultaneously sparing.

The present invention additionally relates to a process for producing functionalized glycans in which a solid glycan extract is first obtained by the process in accordance with the invention for obtaining glycan extracts from apple pomace that comprises at least one glycan and then a) the at least one glycan is converted with at least one amine into at least one functionalized glycan.

In accordance with the invention, a process for obtaining functionalized glycans is thus provided in which a) a mixture comprising apple pomace and water is provided;

b) the mixture is subjected to an extraction treatment in which at least one glycan is extracted from the apple pomace into the water so that an aqueous glycan extract is obtained that comprises the at least one glycan;

c) at least one alcohol is added to the aqueous glycan extract, whereby a solid glycan extract is precipitated that comprises the at least one glycan;

d) the solid glycan extract is separated from the liquid, and e) the at least one glycan is converted with at least one amine into at least one functionalized glycan.

In step e), finally, the at least one glycan (comprised in the solid glycan extract separated in step d)) is converted with at least one amine into at least one functionalized glycan. This can take place, for example, in that the solid glycan extract (separated in step d)) is dissolved in a solvent, preferably water, the solution produced in this process is admixed with the at least one amine, and the reaction mixture thus obtained is subjected to a temperature treatment.

Since the functionalized glycan is produced from a glycan obtained from apple pomace and an amine, it have a very high solubility in water and alcohol-water mixtures. The pKA values of primary amino groups are above 9 so that a reduction of solubility only occurs above pH 9. The functionalized glycans obtained using the process in accordance with the invention thus satisfy epoxy resin systems.

It must in particular be emphasized that the glycan obtained from apple pomace and subsequently functionalized with the amine has a higher water solubility in comparison with commercial and structurally related DEAE dextran.

Viewed overall, the process in accordance with the invention thus represents an inexpensive and resource saving process with which functionalized glycans can be produced that have a high water solubility. These functionalized glycans can thus be used, for example, in coatings for the packaging industry or as an additive in the paper industry.

In accordance with a preferred variant of the process in accordance with the invention, the at least one functionalized glycan is separated from reactants and/or secondary products. A purification of the functionalized glycan is thus achieved. The separation preferably takes place by means of dialysis and/or diafiltration. Since the functionalized glycans obtained in step e) have a high solubility in water and in aqueous alcohol solutions or acetone solutions, they cannot be purified using the precipitation and/or washing methods typical for industrial cationic cellulose and cationic starch. In contrast, a simple and thorough purification of the functionalized glycan can be achieved by dialysis and/or diafiltration.

A further preferred variant of the process in accordance with the invention is characterized in that the at least one amine is selected from the group consisting of 2-chloro-N, N-diethylethylamine, 2-chloro-N,N-dimethylethylamine, 3-dimethylamino-1-propyl chloride, 1-(2-chloroethyl)-pyrrolidine, 1-(2-chloroethyl)piperidine, 1-(3-chloropropyl)piperidine, (2-chloroethyl)trimethylammonium chloride, (3-chloro-2-hydroxypropyl)trimethylammonium chloride and mixtures thereof. By using these specific amines, a functionalized glycan can be obtained that has a particularly high solubility in water and alcohol-water mixtures. The at least one amine is even more preferably 2-chloro-N, -diethylethylamine. The diethylaminoethyl-glycan (DEAE glycan) obtained by the use of 2-chloro-N,N-diethylethylamine with the process has an exceptional solubility in water of 140 mg/ml.

In a further preferred variant of the process in accordance with the invention, the conversion in step e) takes place in that the solid glycan extract is dissolved in at least one solvent, the solution produced in this process is admixed with the at least one amine, and the reaction mixture thus obtained is subjected to a temperature treatment. A simple functionalizing of the glycan can be achieved in a single-step conversion in this manner.

The at least one solvent is preferably water. Due to the good solubility of the glycan in water, the conversion can take place in a homogeneous system, whereby a conversion is made possible that is as complete and as simple as possible.

It is preferred that the temperature treatment in step e) takes place

- at a temperature in a range from 10° C. to 150° C., preferably in a range from 30° C. to 100° C., more preferably in a range from 50° C. to 70° C.; and/or
- over a time period of 30 minutes to 24 hours, preferably of 2 minutes to 12 hours, more preferably of 4 hours to 6 hours and/or
- while stirring.

An improved conversion can be achieved by a conversion at these temperatures and/or in these time periods.

Sodium hydroxide is preferably added to the solution before the solution is admixed with the at least one amine in the conversion in step e).

The present invention likewise relates to a functionalized glycan that is producible or produced using the process in accordance with the invention for the production of functionalized glycans. Due to the manufacture of the functionalized glycan in accordance with the invention from at least one glycan that was obtained from apple pomace and from at least one amine, the functionalized glycan in accordance with the invention has a higher solubility in water and alcohol-water mixtures than functionalized glycans previously known from the prior art.

The present invention also further relates to the use of a functionalized glycan in accordance with the invention as a binder in lacquers, an additive in printing inks, an additive for paper making, and/or a bonding agent in biocomposite materials.

The use as a bonding agent in wood plastic composites (WPCs) and natural fiber composites (NFCs) is based on the introduction of ethyl groups into the glycan. A molecule is thus created that has a high affinity with the cellulose in the wood fiber or in the natural fiber due to the free hydroxyl groups and an increased affinity with thermoplastic materials (polyethylene, polypropylene)n due to the ethyl groups. Propyl groups can also attach to glycans in accordance with the same principle. Since, unlike with the maleic acid anhydride modified PP usual as a bonding agent, the coupling to the cellulose by a hydrogen bond is reversible, the bond can be restored after the effect of strong shear forces. This benefits the impact resistance of a biocomposite material.

The present invention will be explained in more detail with reference to the following Figures and examples without restricting it to the specific embodiments and parameters shown here.

EMBODIMENT

An exemplary performance of the process in accordance with the invention for obtaining glycan extracts and of the process in accordance with the invention for producing functionalized glycans are described in the embodiment. A glycan or a mixture of glycans from apple pomace is first obtained here. Subsequently a single stage aminization of the obtained glycan or of the acquired glycans can be achieved by attaching DEAE in homogeneous systems. The degree of substitution is determined by the determination of the N content by means of elementary analysis.

The obtaining of the glycan or glycans from apple pomace is shown schematically at pilot plant scale in FIG. 1. A mixture comprising apple pomace 1 and water is first provided in an extractor 2. The apple pomace was here already depectinized by the manufacturer by a pre-treatment with sulfuric acid. The apple pomace is used without any further purification. On a dry substance base, the material of batch A comprises approximately 4.3% hemicelluloses and batch B approximately 5.8% (in accordance with expanded Weender analysis).

In the extractor 2, the mixture is subjected to an extraction treatment in which a glycan or a plurality of glycans is/are extracted from the apple pomace 1 into the water so that an aqueous glycan extract is obtained that comprises the glycan or glycans. With an extraction volume of 60 liters, the extraction is carried out here at a mass ratio of solid (i.e. apple pomace) to water of 1:25. The extractor 2 is vented or purged with nitrogen and the suspension is extracted in a percolation process (50 L/min) at 145° C. for 90 minutes. Subsequently, the suspension is speedily cooled down with water to 50° C. and the aqueous glycan extract is separated from the solid 3, i.e. the solid residues of the apple pomace, via a filter station using filters of a mesh of 40 μm and is conducted via a pipe 4 into a precipitation reactor 5. A solid glycan extract that comprises the glycan or glycans is precipitated in the precipitation reactor 5. The precipitation takes place while adding ethanol that is conducted from an alcohol reservoir 6 into the precipitation reactor 5 until an 80% solution is reached. The subsequent isolation 7 of the solid glycan extract takes place via a filter station having nylon filament (nominal pore width 1 μm). The solid glycan extract is then subjected to drying 8.

The liquid remaining in the precipitation reactor 5 on the isolation 7 is conducted into a storage reactor 9 and a rectification column 10 where a rectification takes place. The ethanol obtained by the rectification is again conducted into the alcohol reservoir 6. The remainder 11 remaining after the rectification is drained off.

Alternatively to the just described pilot plant scale, glycan can also be obtained from apple pomace at lab scale. At a lab scale (extraction volume 50 mL), the extraction is treated with a mass ratio of solid to water of 1:10 at 200° C. for 130 minutes in a pressure digestion device without stirrer. The obtained extract is filtered and the apple glycan or glycan mixture is precipitated by adding alcohol at a concentration of 80% (v/v). The apple glycan or glycan mixture is filtered. 5% of the initial weight is obtained after the drying.

Figure 2A:
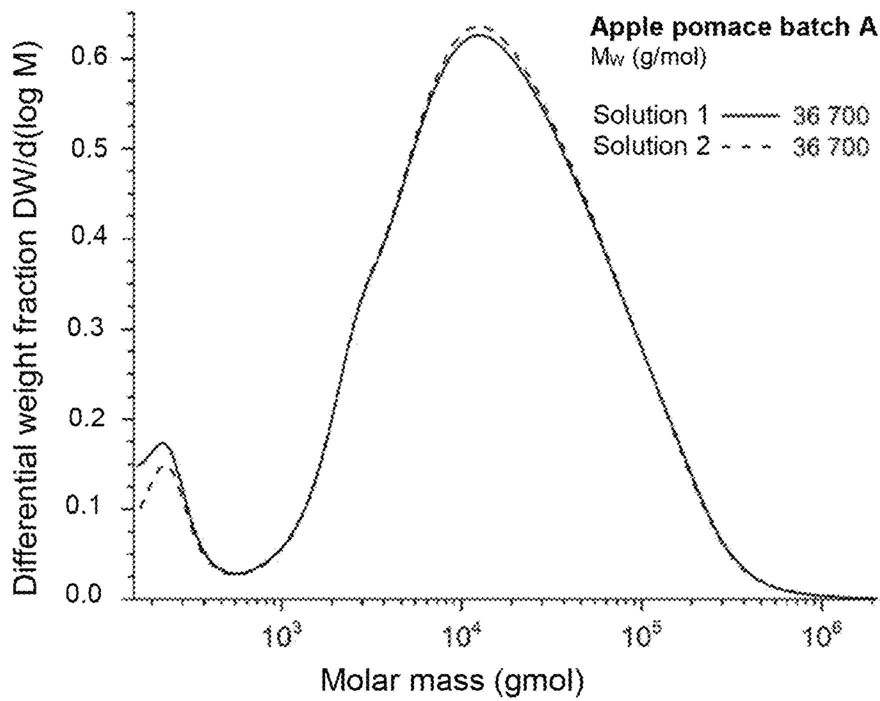
FIG. 2*a* depicts a GPC chromatograph of the apple pomace batch A in an aspect of the invention.
Figure 2B:
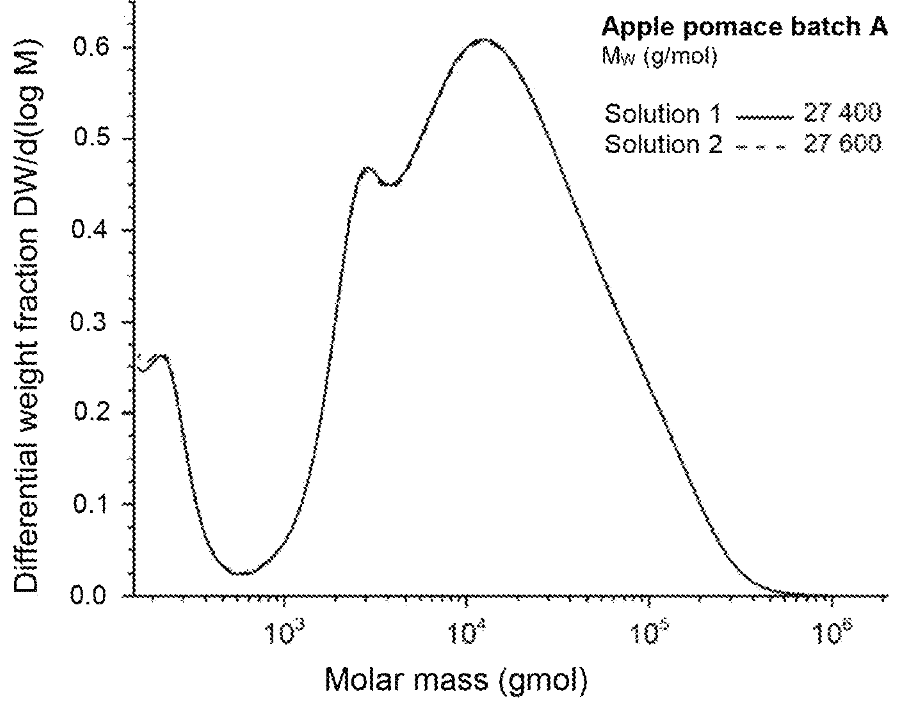
FIG. 2*b* depicts a GPC chromatograph of the apple pomace batch B in an aspect of the invention.
Figure 3A:
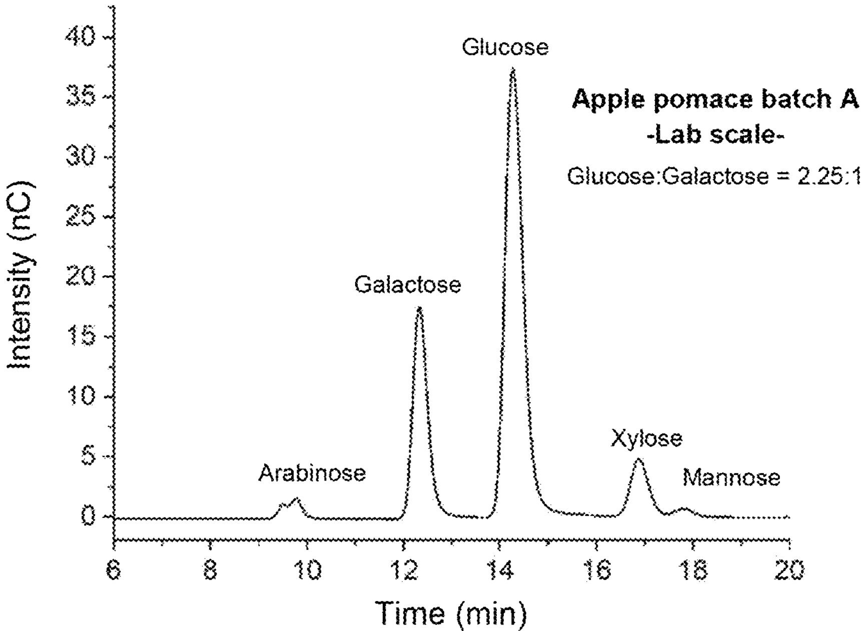
FIG. 3*a* depicts a HPLC Chromatograph of the apple pomace batch A at laboratory scale in an aspect of the invention.
Figure 3B:
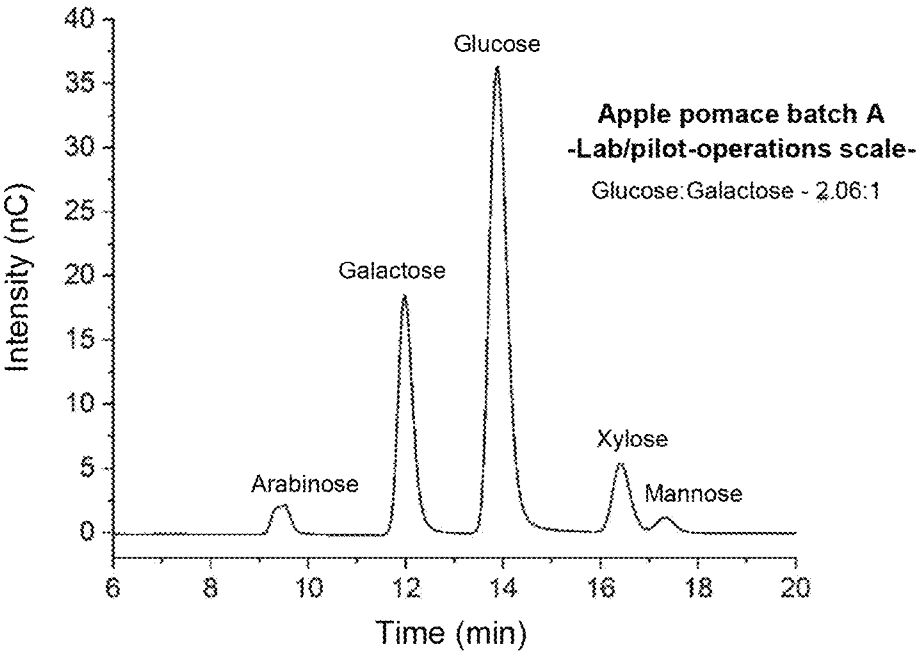
FIG. 3*b* depicts a HPLC Chromatograph of the apple pomace batch A at pilot plant scale in an aspect of the invention.
Figure 3C:
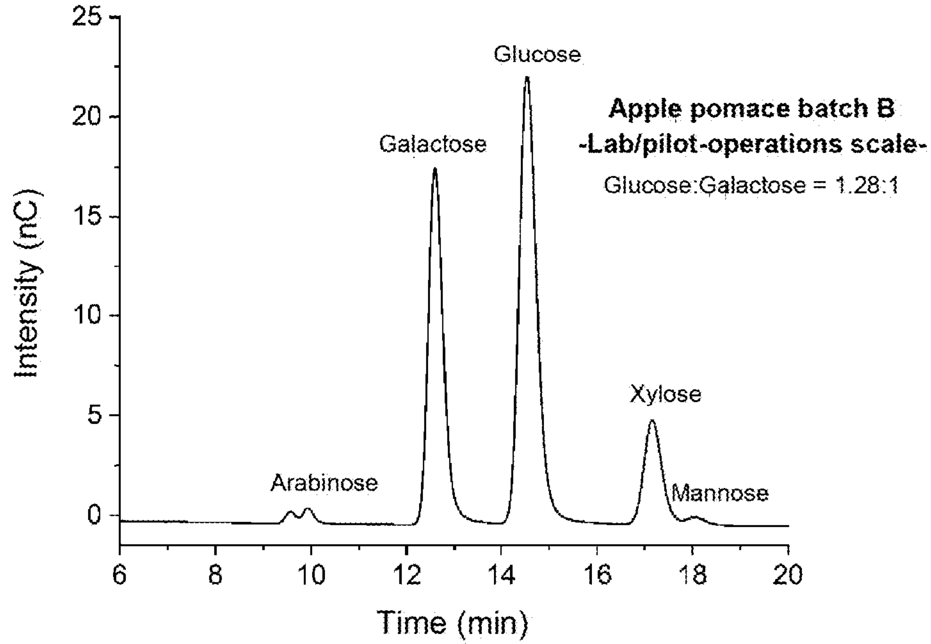
FIG. 3*c* depicts a HPLC Chromatograph of the apple pomace batch B at laboratory scale in an aspect of the invention.
Figure 3D:
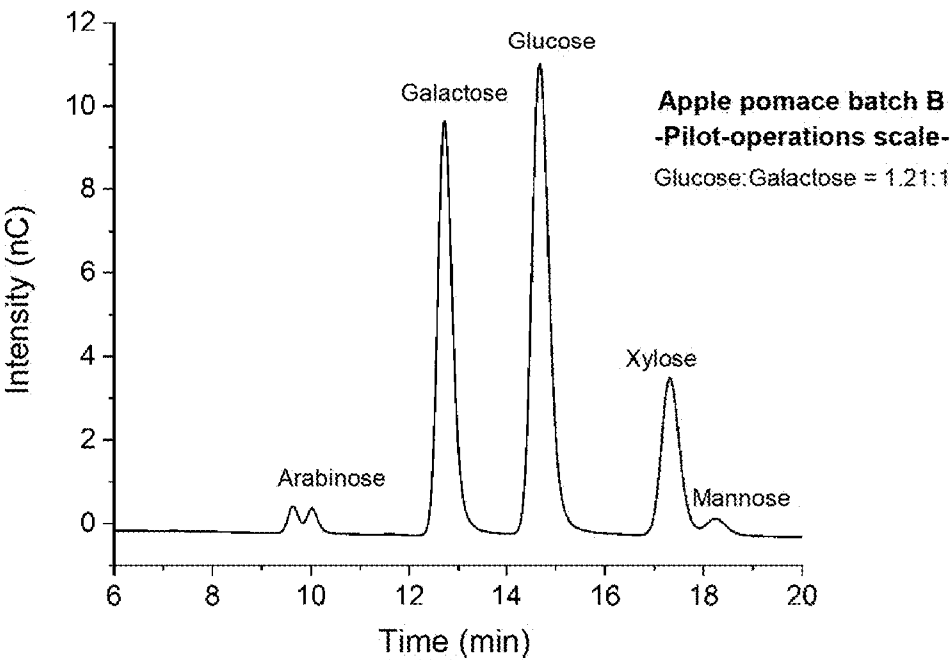
FIG. 3*d* depicts a HPIC chromatograph of the apple pomace batch B at pilot plant scale in an aspect of the invention.

The apple glycan or glycan mixture obtained at pilot plant scale and at lab scale was examined with respect to its protein content and polyphenol content and the weight mean molecular mass and the sugar fraction were determined. Independently of the extraction process, the protein content is 1.2% (CHNS pilot plant scale—C: 30.5 h/34.9, H: 5.0/5.9, N: 0.2/0.1, S: 3.8/2.3: CHNS lab scale—C: 35.6 H 6.2, N: 6.2, N: 0.2 S: 1.0) and the polyphenol content below 1%. The weight mean molecular mass fluctuates between 27 and 36 kDa (calibrated to Pullulan) depending on the batch of apple pomace used. This is illustrated by FIGS. 2*a* and 2*b* in which GPC chromatographs of the apple pomace batches A (FIG. 2*a*) and B (FIG. 2*b*) are shown at pilot plant scale. This fluctuation starting from the apple pomace batch used can likewise be observed in the sugar distribution, particularly in the ratio of glucose to galactose. This is illustrated by Table 1 and by FIGS. 3*a*, 3*b*, 3*c*, and 3*d*, where FIGS. 3*a* to 3*d* show HPIC chromatographs of the apple pomace batches A and B at lab scale and at pilot plant scale. A reduction of the total sugar from the lab scale to the pilot plant scale is furthermore shown (65.9% to 57.5%).

TABLE 1

Sugar distribution of the apple pomace batches A and B at lab scale and at pilot plant scale

| | Glucose [%] | Galactose [%] | Xylose [%] | Mannose [%] | Arabinose [%] | Total [%] |
|---|---|---|---|---|---|---|
| AT Batch A-lab- | 43.5 | 19.3 | 5.9 | 2.2 | 1.0 | 71.8 |
| AT Batch A-pilot plant/lab- | 40.9 | 19.9 | 6.4 | 3.5 | 1.3 | 72.0 |
| AT Batch B-pilot plant/lab- | 32.0 | 25.0 | 6.1 | 2.0 | 0.8 | 65.9 |
| AT Batch B-pilot plant- | 25.5 | 21.0 | 7.1 | 3.1 | 0.9 | 57.5 |

In a further step, the aminization of the glycan or glycans in the glycan mixture can take place at the lab scale of 200 mg up to 15 g of the starting material. The apple glycan or glycan mixture is dissolved in water (30-36 w/v%) and sodium hydroxide (6 equivalents) is added while stirring. Subsequently, 2-chloro-N,N-diethylethylamine hydrochloride (3 equivalents) is added to the reaction mixture and is stirred at 58 to 60° C. for 5 hours. The reaction is ended by neutralizing the mixture and is dialyzed at 6° C. with water for 5 to 7 days. 45 to 98% of a beige solid is obtained after drying. The yield decreases here as the preparation size reduces.

The obtained DEAE apple glycan or DEAE glycan mixture was examined by means of elementary analytics and the degree of substitution (DS) was determined using the determined nitrogen content (see Table 2). The nitrogen content is 3.3 to 3.8% and the DS determined therefore is 0.50 to 0.58.

TABLE 2

CHNS analytics of the different lab preparations

| Preparation size | CHNS [%] | DS (DEAE) |
|---|---|---|
| 0.2 kg | C: 46.2 H: 8.0, N: 3.8, S: 0.2 | 0.58 |
| 2.0 kg | C: 45.2 H: 8.1, N: 3.5, S: 0.6 | 0.52 |
| 15.0 kg | C: 44.9 H: 7.6, N: 3.3, S: 0.9 | 0.50 |

Figure 4:
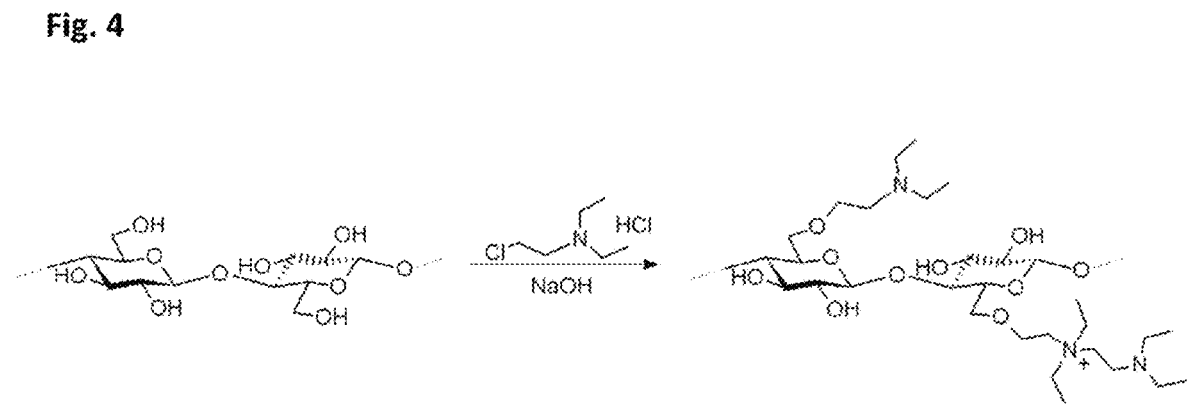

This corresponds to one DEAE substituents per two, possibly three, glucose units since the synthesis introduces two kinds of DEAE substituents into the glycan molecule. This is illustrated by FIG. 4 in which the chemical synthesis of the aminization of apple glycan with 2-chloro-N,N-diethylethylamine is shown schematically. The predominant substituent is the single tertiary group that, however, in particular reacts further at a higher DS and produces a "tandem" group that comprises both a quaternary amine and the tertiary amine.

In comparison with the commercial DEAE dextran (mean value=10,000 g/mol), DEAE apple glycan displays similar properties with respect to the nitrogen contact. The nitrogen content of DEAE dextran amounts to 2.5 to 4.5% and the degree of substitution (DS) to be determined therefrom is 0.33 to 0.75: the content of DEAE glycan is exactly in the middle thereof at 3.3 to 3.8% and a DS of 0.50 to 0.58. The water solubility of DEAE glycan at 140 mg/ml shows an improvement over that of DEAE dextran at 100 mg/ml. This would be due to the fact, for example, of the greater branching of the apple glycan over that of the dextran. In addition to the water solubility, DEAE apple glycan (40 w/v %) could likewise be dissolved in a water/ethanol mixture (60/40).

The invention claimed is:

1. A process for producing functionalized glycan comprising the process comprising:

(a) providing a mixture comprising apple pomace and water;

(b) subjecting the mixture to an extraction treatment in which at least one glycan is extracted from the apple pomace into the water so that an aqueous glycan extract is obtained and comprises the at least one glycan;

(c) adding at least one alcohol to the aqueous glycan extract, whereby a solid glycan extract is precipitated and comprises the at least one glycan; and (d) separating the solid glycan extract from remaining liquid component (i) and obtaining a solid glycan extract from apple pomace that contains at least one glycan and converting the at least one glycan into at least one functionalized glycan by reacting with at least one amine selected from the group consisting of 2-chloro-N,N-diethylethylamine, 2-chloro-N,N-dimethylethylamine, 3-dimethylamino-1-propyl chloride, 1-(2-chloroethyl)-pyrrolidine, 1-(2-chloroethyl)piperidine, 1-(3-chloropropyl)piperidine, (2-chloroethyl) trimethylammonium chloride, and (3-chloro-2-hydroxypropyl)trimethylammonium chloride.

2. The process according to claim 1, wherein the at least one functionalized glycan is separated from reactants and/or secondary products.

3. The process according to claim 1, wherein the conversion is carried out by dissolving the solid glycan extract in at least one solvent, the resulting solution is admixed with the at least one amine, and the resulting reaction mixture is subjected to a temperature treatment.

4. The process according to claim 3, wherein the temperature treatment is subjected at a temperature in a range from 10° C. to 150° C.; and/or over a time period of 30 minutes to 24 hours; and/or with stirring.

5. The process according to claim 3, wherein sodium hydroxide is added to the solution before the solution is admixed with the at least one amine in the conversion step.

6. A functionalized glycan produced by a process comprising:

(a) providing a mixture comprising apple pomace and water, (b) subjecting the mixture to an extraction treatment in which at least one glycan is extracted from the apple pomace into the water so that an aqueous glycan extract is obtained and comprises the at least one glycan, (c) adding at least one alcohol to the aqueous glycan extract, whereby a solid glycan extract is precipitated and comprises the at least one glycan, and (d) separating the solid glycan extract from remaining liquid component, and (e) reacting the solid glycan extract with at least one amine to produce the functionalized glycan, wherein the at least one amine is selected from the group consisting of 2-chloro-N,N-diethylethylamine, 2-chloro-N,N-dimethylethylamine, 3-dimethylamino-1-propyl chloride, 1-(2-chloroethyl)-pyrrolidine, 1-(2-chloroethyl)piperidine, 1-(3-chloropropyl)piperidine, (2-chloroethyl)trimethylammonium chloride, and (3-chloro-2-hydroxypropyl)trimethylammonium chloride.

7. A method of making a binder for a lacquer, an additive for a printing ink, an additive for paper making, and/or adhesive in a biocompatible material comprising utilizing a functionalized glycan according to claim 6.

* * * * *